United States Patent

Freynhofer

[11] Patent Number: 5,865,472
[45] Date of Patent: Feb. 2, 1999

[54] COMPENSATOR FOR TEMPERATURE-CAUSED LENGTH CHANGES

[75] Inventor: Albrecht Freynhofer, Schiffweiler, Germany

[73] Assignee: Hoechst Trespaphan GmbH, Neunkirchen, Germany

[21] Appl. No.: 990,839

[22] Filed: Dec. 15, 1997

[30] Foreign Application Priority Data

Dec. 19, 1996 [DE] Germany ............ 196 52 952.2

[51] Int. Cl.⁶ ......................................... F16L 53/00
[52] U.S. Cl. ........................... 285/41; 285/302; 285/179
[58] Field of Search .................... 285/298, 302, 285/187, 41, 181, 179

[56] References Cited

U.S. PATENT DOCUMENTS

| | | | |
|---|---|---|---|
| 3,692,447 | 9/1972 | Nelson | 425/113 |
| 3,807,777 | 4/1974 | Larkin | 285/302 |
| 3,849,051 | 11/1974 | Solbeck | 425/376 |
| 4,179,256 | 12/1979 | Tomioka et al. | 425/71 |
| 4,239,264 | 12/1980 | Evans | 285/173 |
| 5,137,675 | 8/1992 | Rabe | 264/171 |
| 5,746,453 | 5/1998 | Roberts | 285/47 |

FOREIGN PATENT DOCUMENTS 1 591 317  6/1981  United Kingdom .

*Primary Examiner*—Kenneth J. Dorner
*Assistant Examiner*—Daniel Gambrill
*Attorney, Agent, or Firm*—Foley & Lardner

[57] ABSTRACT

A compensator 11 comprises a housing 14 and a sliding ram 13, which is displaceable along a sliding seat 17. The sliding ram 13 includes a flow channel portion 21, which transitions into an elbow bend 30, which, in the operating state, i.e., when hot polymer melt flows through the compensator, is congruent with a further flow channel portion 20. The two flow channel portions 20, 21 have flanges 28 and 29 at their end faces for the installation of the compensator 11 at a bend in a melt line through which a polymer felt flows, to compensate for linear expansions of the melt line due to the increased temperature.

14 Claims, 3 Drawing Sheets

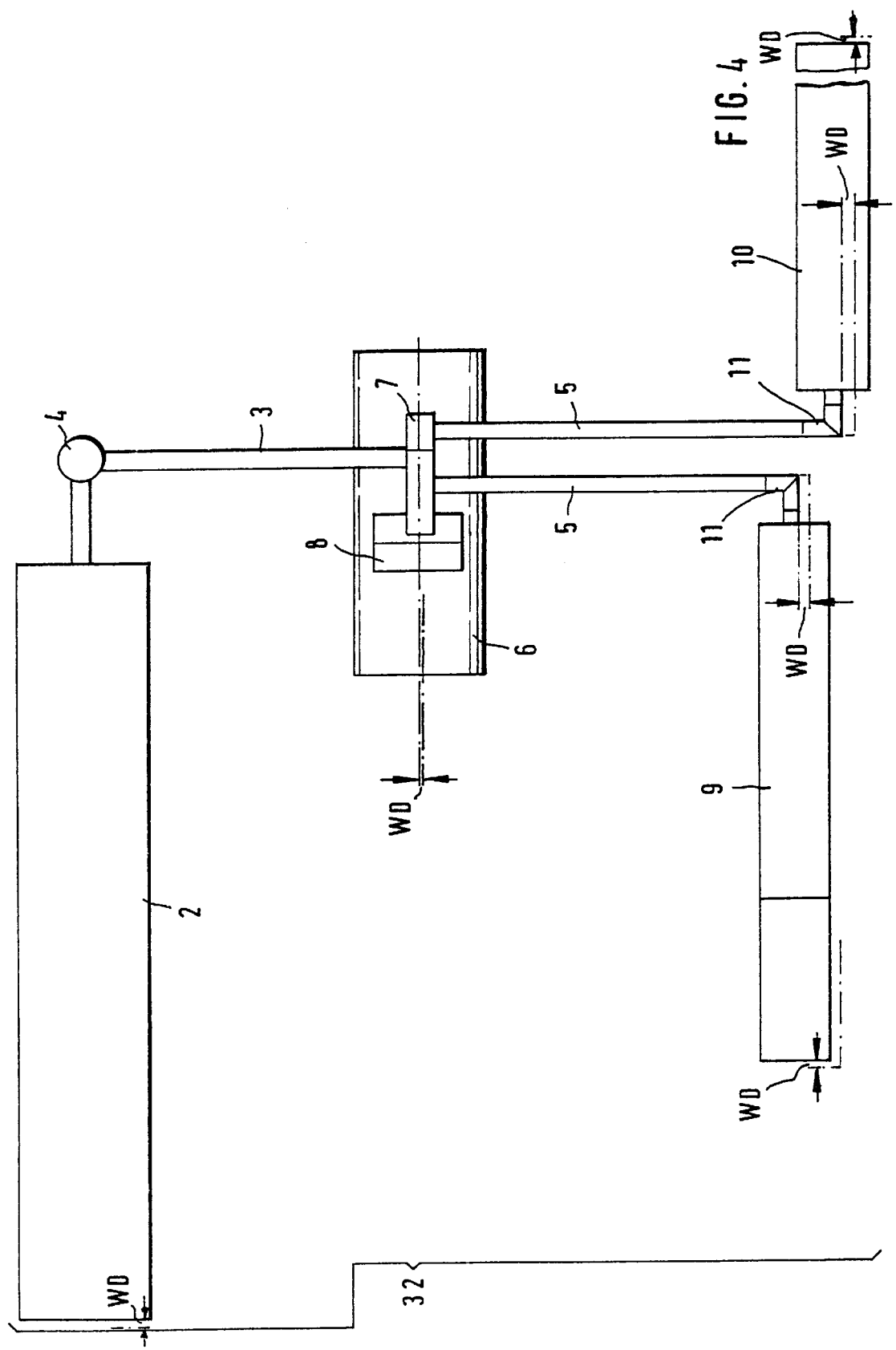

COMPENSATOR FOR TEMPERATURE-CAUSED LENGTH CHANGES

BACKGROUND OF THE INVENTION

The present invention relates to a compensator to compensate for the changes in length caused by temperature effects of fixed installations, such as lines, flow channels and the like through which a product flows.

In the case of many polymer processing machines which melt granules or pellets and feed them into a common slot die in order to coextrude a multilayer film, the difficulty arises that, owing to the flow of melt at temperatures of up to 300° C., there occur thermal expansions of the melt lines which connect coextruders and extruders to an adapter and/or a multilayer die or slot die. In this case, when the melt zone is heated to operating temperatures in the range of up to 300° C., the thermal expansion can cause the length of melt lines to change by about up to 2.8 mm/linear meter. These changes in length or thermal expansions of the melt lines take place according to the formula $$l_w = l_k + (l_k \cdot \Delta t \cdot c) = l_k + (l_k \cdot 250° \text{ C.} \cdot 11 \cdot 10^{-6}/° \text{ C.})$$

This change in length, starting from a fixed point, displaces the coextruders rearward with respect to the slot die. Known installations with extruders and coextruders are therefore constructed in such a way that the coextruders can be moved in the axial direction, on condition that the melt lines likewise run in or parallel to the axial direction.

In the case of coextruders which are arranged at right angles to the film take-off from the slot die and are set up in this way to save space, these changes in length of the melt lines cause leakages to occur at the 90° bends of the melt lines, and tensioning chains may be destroyed, with the correspondingly associated risk of accidents. In order to avoid such problems, the coextruders can be moved in the direction of their transverse axis to correct them according to the thermal expansion of the melt lines. However, this necessitates complex displacing devices, combined with corresponding distance measuring systems. Considerable extra costs per extruder installation are thereby engendered, since it is necessary to compensate for linear expansions in the range of 15 to 25 mm per coextruder.

For use in a completely different context, namely for deflecting a melt flow, so-called start-up valves are known. These are used in a start-up position for deflecting the melt flow out of the extruder into the open during the starting phase, in order to discharge unwanted material. After this purging operation, the valve is switched back into its operating position. The known start-up valve has a hydraulic system which makes it possible to switch the valve over into the respectively required operating position while the extruder is running.

SUMMARY OF THE INVENTION

It is therefore an object of the present invention to provide an improved device which compensates for thermally induced changes in length. A particular object of the invention resides in providing a length compensation device for lines which connect extruders and coextruders to an adapter and a slot die, in order to avoid leakages at the bends of the lines and the destruction of tensioning chains which connect the bends.

Still a further object of the invention is to provide for an improved extrusion installation for polymer films, preferably a coextrusion installation for multilayer films, as well as a method for compensating for axial thermal expansion in such installations.

In accomplishing the foregoing objects, there has been provided according to one aspect of the present invention a compensator to compensate for changes in length caused by temperature effects of fixed installations through which a product flows. The compensator comprises a housing block, and a sliding ram movably associated with the housing block, the sliding ram being rotationally secured with respect to the housing block and movable along a product-impermeable sliding seat on the housing block. The housing block and sliding ram form a bent flow channel which terminates at its inlet and outlet ends with a first flange portion of the housing block and a second flange portion of the sliding ram, whereby these flange portions provide for connection to the fixed installation.

In accordance with another aspect of the present invention, there has been provided an extrusion installation for polymer articles, comprising a compensator as defined above connecting two melt lines running at an angle to each other.

In accordance with still another aspect of the invention, there has been provided a method for compensating for axial thermal expansions of product lines in an installation for processing a heated product, comprising the step of connecting a compensator as defined above in the flow path between two heated product lines that meet at an angle.

Further objects, features and advantages of the present invention will become apparent from the detailed description of preferred embodiments that follows, when considered together with the accompanying figures of drawing.

BRIEF DESCRIPTION OF THE DRAWINGS

The invention is explained in more detail below with reference to the drawings, in which:

FIG. 4 diagrammatically shows a second extrusion installation having two coextruders and one main extruder, in which compensators which connect the coextruders and the main extruder to an adapter are fitted at the bends of the lines.

DETAILED DESCRIPTION OF THE PREFERRED EMBODIMENTS

Figure 1:
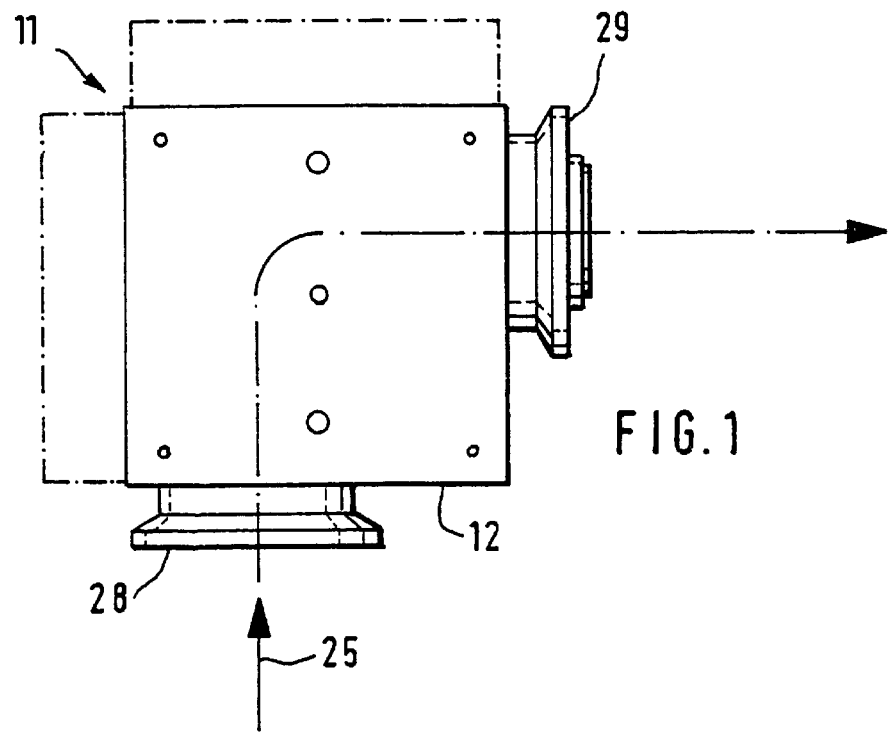
FIG. 1 shows a plan view of a compensator according to the invention.

According to the invention, a compensator is provided to compensate for the changes in length caused by temperature effects of fixed installations, such as lines, flow channels and the like through which a product flows. The compensator contains in a housing block a sliding ram, which is rotationally secured with respect to the housing block. The sliding ram is movable along a product-impermeable sliding seat in the housing block, and the compensator has a bent flow channel, which is respectively equipped on the inlet and outlet sides with a flange for the connection of the fixed installations.

In one preferred embodiment of the invention, the housing block accommodates the sliding ram, there is a first flow channel portion of the flow channel in the lower part of the housing block, and the part is equipped with an inlet flange.

In a further embodiment of the invention, the sliding ram includes a second flow channel portion with an elbow bend in the flow channel. At the operating temperature of the product flowing through the fixed installations and the compensator, the sliding arm assumes a position within the sliding seat in which the elbow bend is congruent or nearly congruent with the first flow channel portion in the housing block, which is equipped with an outlet flange.

Seen purely externally, the compensator has the form of a conventional housing block, but comprises two parts, on the one hand a housing part with the connection flange for the product feed and, on the other hand, a sliding ram with the connection flange for the product discharge in the direction of the extrusion die (multilayer die or adapter). The sliding ram is guided in the housing block movably along a product-impermeable sliding seat, but rotationally secured in its longitudinal axis, and has in the channel region the actual angle bore (elbow bend), which, after reaching the operating temperature, comes to lie congruently or nearly congruently with respect to the feed bore of the fixedly installed housing block.

The compensator is advantageously used according to the invention as an element for connecting two melt lines running at right angles to each other in a coextrusion installation for multilayer films. In this case, the compensator is used to compensate for the axial thermal expansions of the melt lines connected to it and of the coextruder connected to one of the melt lines.

The invention achieves the advantage of a considerable cost saving, since it is possible to dispense with the complex displacing devices customary in the prior art. The invention also enables elimination of the corresponding distance measuring systems, which are required, for example, in an extrusion installation, in order to move the coextruders in the direction of their transverse axis to correct for thermal expansion. In comparison with the displacing devices with corresponding distance measuring systems, the compensator according to the invention can be produced at very low cost, since it substantially comprises two parts, namely, a housing block for accommodating a sliding ram and the associated sliding ram.

Turning now to the drawings, FIG. 1 shows the side view a compensator 11, which has flanges 28, 29 and heating plates 12 on its outer sides. The outlines of the heating plates 12 are indicated by dash-dotted lines. It should be noted here that not only the compensator 11, but also the lines 3, 5 and 5 (cf. FIGS. 3 and 4) are heated, in order to keep the polymer melt emerging from the extruder and the coextruders adequately heated and plastified on its way to the extrusion die for extrusion. The compensator 11 is connected via the flanges 28 and 29 to lines through which, for example, a polymer melt flows. A direction of flow 25 through the compensator 11 is indicated by a bent arrow.

Figure 2:
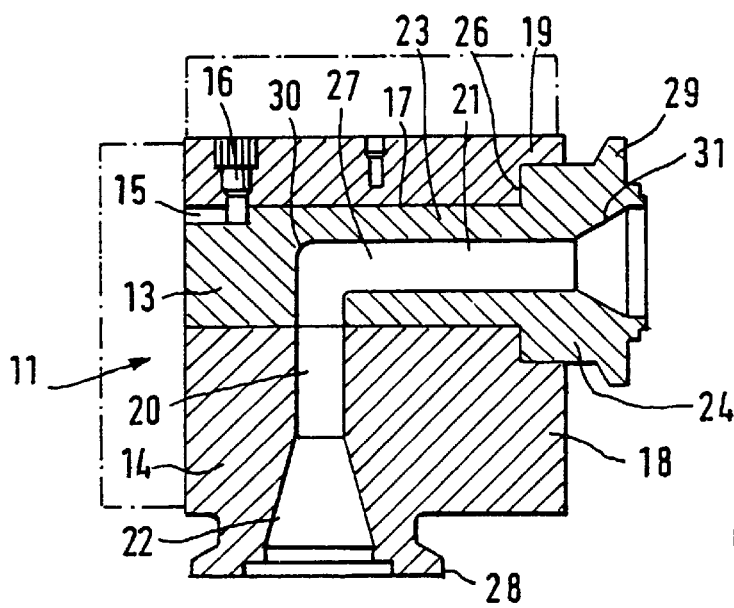
FIG. 2 shows a section through the compensator according to FIG. 1.

As the section through the compensator 11 in FIG. 2 reveals, the compensator substantially comprises two parts, namely, a housing block 14 and a sliding ram 13. The sliding ram 13 is displaceable along a product-impermeable sliding seat 17 in the housing block 14. The part located above the sliding ram 13 is identified by the reference numeral 19 and the part of the housing block 14 lying below the sliding ram is identified by the reference numeral 18. The sliding ram comprises two ram portions 23 and 24, which have different diameters. In this case, the longer (rear) ram portion 23 has a smaller diameter than the shorter (forward) ram portion 24.

The geometry of the cylindrical sliding seat 17 is adapted to the outline of the sliding ram 13, with the sliding seat widening via a collar 26 so that the shorter ram portion 24 can be accommodated.

The compensator 11 includes a bent flow channel 27, which is respectively equipped on its inlet and outlet sides with the flange 28 and 29 for connecting the compensator 11 to fixed installations such as lines, flow channels and the like. The flow channel 27 is made up of a first flow channel portion 20 and a second flow channel portion 21 with an elbow bend 30. The first flow channel portion 20 is located in the housing block 14, while the second flow channel portion 21, with the elbow bend 30, is arranged in the sliding ram 13. At the operating temperature of the polymer melt flowing through the compensator 11 and the fixed installations, the sliding ram 13 assumes a position within the sliding seat 17 in which the elbow bend 30 is preferably congruent with the first flow channel portion 20 in the lower housing block 14, and the one end face of the sliding ram 13 is in line with the one side wall of the housing block 14.

The housing block 14 encloses the cylindrical sliding seat 17 of the sliding ram 13. At the operating temperature of the compensator 11, the shorter ram portion 24 bears against the collar 26 and, at temperatures less than the operating temperature, the sliding ram 13 is displaced in the direction of the second flow channel portion 21. The shorter ram portion 24 thereby moves away from the collar 26, and the elbow bend 30 is no longer congruent with the first flow channel portion 20 in the lower part 18 of the housing block 14. The displacement distance of the sliding ram 13 is equal to the diameter of the first flow channel portion 20, less at least 5 mm, with the result that the elbow bend 30 coincides or communicates with the flow channel portion 20 over a distance of at least 5 mm when the sliding ram 13 is displaced to its maximum extent. This ensures that the flow channel 27 remains still passable for the polymer melt in any position of the sliding ram.

In the direction of the flanges 28 and 29, the flow channel portions 20 and 21 respectively transition into conical widenings 22 and 31. However, such conical widenings are not compulsory, and the flow channel portions may equally transition into the flanges 28, 29 in a straight line or uniform cross-section.

The sliding ram 13 has a longitudinal groove 15, into which there engages a pin 16, which extends through the upper part 19 of the housing block 14. With the aid of this pin 16, the sliding ram 13 is rotationally secured and can only execute a longitudinal displacement in the housing block 14, since the pin 16 is restrained in the longitudinal groove 15 of the sliding ram 13.

Figure 3:
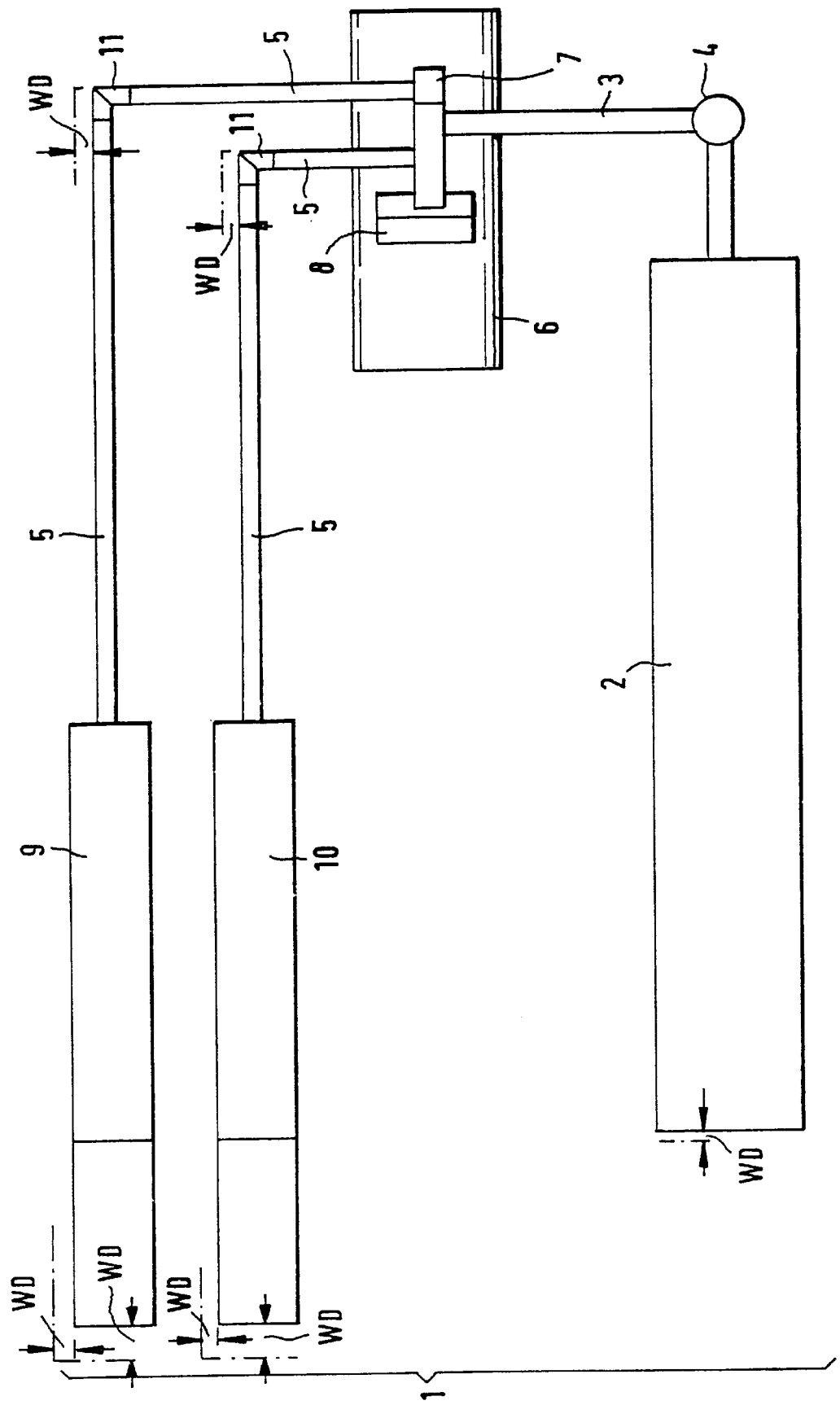
FIG. 3 diagrammatically shows an extrusion installation having two coextruders and one main extruder, in which at the bends of the lines between the coextruders, the main extruder and an adapter, there is a respective compensator fitted in the lines.

The preferred and highly advantageous use of compensators 11 in lines within a polymer extrusion installation is described with reference to FIGS. 3 and 4. According to FIG. 3, such an extrusion installation 1 can comprise one main extruder 2 and two coextruders 9 and 10, which are aligned parallel to the main extruder 2. Right-angled melt lines 5,5 lead from the coextruders 9 and 10 to an adapter 7. The main extruder 2 is likewise connected to the adapter 7 via a right-angled melt line 3, in which a filter 4 is fitted. In the adapter 7, the three polymer streams from the extruders, namely, the one stream from the main extruder 2 and the two streams from the two coextruders 9 and 10, are superposed on one another in a known way, and fed to a multilayer die 8, which is generally a slot die. The multilayer die 8 extrudes a so-called prefilm onto a take-off roller 6, on which the prefilm is cooled and subsequently transported, for example, through a water bath, before it passes into a stretching frame and is biaxially stretched. The melt lines 3, 5 and 5 as well as the compensators 11 are in each case externally heated, for example, by electrically heated plates on the compensators and heating medium tubes, which surround the melt lines. Installed respectively at the bends of the melt lines 5, 5 are the compensators 11, to compensate for the changes in length of the melt lines caused by heating. The extrusion of the polymer granules or pellets in the extruders 2, 9 and 10 causes a considerable heating up of the molten polymer emerging from the extruders. In order to retain the viscosity of the molten polymer up to the extrusion die, the heating of the melt lines takes place, and this increases the lengths of the melt lines by about 2.8 mm/linear meter of melt line. The thermal expansion is calculated according to the formula $$1_w = 1_k + (1_k \cdot \Delta t \cdot c) = 1_k + (1_k \cdot 250° C \cdot 11 \cdot 10^{-6}/° C.)$$

where $1_w$ is the length of the melt lines 3, 5 and 5 at the operating temperature, and $1_k$ is the length of the melt lines 3, 5 and 5 in the cold state. The temperature difference between the cold state and the warm state is assumed to be 250° C. The coefficient of specific thermal expansion is in this case $11 \cdot 10^{-6}/° C$.

In the extrusion installation 1, the filter 4 is provided as a fixed point for the main extruder 2 and the entire remaining extrusion system. From the cold initial state until reaching the operating temperature of the polymer melt in the melt lines 3, 5 and 5, the melt lines expand by the distance WD, both in the longitudinal direction and in the transverse direction of the main extruder 2 and of the coextruders 9 and 10. The distance WD is denoted in the transverse direction, while it is indicated in the longitudinal direction only by an arrow WD. Since the filter 4 of the main extruder 2 is the fixed point or reference point of the extrusion installation 1, the coextruders 9 and 10 are displaced rearwardly with respect to the adapter 7 and the multilayer die 8 by the distance WD, both in the same direction as and transversely with respect to the longitudinal axis of the coextruders. For this reason, the coextruders must be set up movably in the axial direction, to be able to compensate for the linear expansions of the melt lines in the longitudinal direction. Compensation for the thermal expansion in the transverse direction, however, presents considerable problems, since complex sliding devices for the transverse direction, combined with corresponding distance measuring systems, have to be provided in order to avoid leakages of the melt lines at the bends. These additional displacing devices must then move the coextruders in the direction of their transverse axis to correct them according to the thermal expansion of the melt lines.

This is remedied by the compensators 11 being fixedly installed for warm dimensions at the bends of the two melt lines 5 and 5 and consequently forming fixed points for the thermal expansions of the melt lines in the longitudinal direction of the coextruders. The compensators 11 are in this case installed in such a way that their sliding rams 13 are directed in the direction of the take-off roller 6 (i.e., toward the roller and parallel to the roller axis), and transversely with respect to the longitudinal direction of the coextruders 9 and 10. Warm dimensions are to be understood as meaning that the sliding rams 13 of the compensators 11 are extended in the direction of the take-off roller 6 in the cold state, i.e., before the operating temperature has been reached, and their elbow bends 30 are not congruent with the respective flow channel portion 20.

During heating up and the associated linear expansions of the melt lines 3, 5 and 5, on the one hand a displacement of the coextruders 9 and 10 along their longitudinal axes takes place, starting from the fixedly installed compensators 11, and on the other hand the sliding rams 13 move in the transverse direction out of the extended state into the retracted state, into the housing blocks 14 of the compensators 11. As soon as the operating temperature has been reached in the extrusion installation 1, the sliding rams 13 in the sliding seats 17 assume the position in which the elbow bend 30 is preferably congruent with the first flow channel portion 20. The displacement of the sliding rams 13 out of the position in the cold state of the extrusion installation into the position in the operating state corresponds to the linear expansion of the melt lines 3, 5 and 5, with the result that the displacement causes compensation for the changes in length at the melt lines between the adaptor and the bends of the melt lines, without mechanical stresses occurring at the bends.

Represented in FIG. 4 is an extrusion installation 32 which, similar to the extrusion installation 1, comprises one main extruder 2 and two coextruders 9 and 10. The only difference with respect to the extrusion installation 1 of FIG. 3 is that the two coextruders 9 and 10 are not arranged parallel to each other but are offset slightly with respect to each other only in relation to the common line of alignment. It is the case, however, that both the coextruder 9 and the coextruder 10 are aligned parallel to the main extruder 2. Located respectively at the bends of the melt lines 5 and 5, which lead from the coextruders 9 and 10 to the adapter 7, there are compensators 11. A further melt line 3 connects the main extruder 2 via a filter 4 to the adapter 7. The filter 4 is in turn the fixed point of the extrusion installation 32. The adapter 7 is connected to a multilayer die 8, from which a prefilm is extruded onto a take-off roller 6. The thermal expansion WD of the melt lines 3, 5 and 5 in the transverse direction with respect to the coextruders is compensated by the compensators 11. For this purpose, the sliding rams 13 of the compensators 11 are extended in the cold state of the extrusion installation 32 transversely with respect to the longitudinal direction of the coextruders 9 and 10 in the direction of the take-off roller 6. The linear expansion of the melt lines 3, 5 and 5 up until reaching the operating temperature of the extrusion installation 32 causes the sliding rams 13 to be pushed into the compensators 11, or into their housing blocks 14, with the result that, when the operating temperature is reached, the elbow bend 30 is congruent with the first flow channel portion 20 in the housing block 14.

Consequently, the compensation for the thermal expansions of the melt lines 3, 5 and 5 with the aid of the compensators 11 takes place in the same way as was described in connection with the extrusion installation 1 in FIG. 3.

The entire disclosure of German Patent Application No. 196 52 952.2, filed Dec. 19, 1996, is hereby incorporated by reference.

Although the present invention has been described above with reference to certain preferred embodiments, it will be apparent to those skilled in the art that various additions, changes and/or modifications can be made to these embodiments without departing from the spirit or basic concept of the invention.

What is claimed is:

1. A compensator to compensate for changes in length caused by temperature effects of fixed installations through which a product flows, the compensator comprising a housing block; and a sliding ram movably associated with said housing block, the sliding ram being rotationally secured with respect to the housing block and movable along a product-impermeable sliding seat on the housing block, said housing block and sliding ram forming a bent flow channel which terminates at its inlet and outlet ends with a first flange portion of said housing block and a second flange portion of said sliding ram, said flange portions providing for connection to the fixed installation.

2. A compensator as claimed in claim 1, wherein said sliding ram is contained within said housing block, wherein a first part of the housing block contains a first flow channel portion of the flow channel and wherein said first part of the housing block includes said first flange portion which comprises an inlet flange.

3. A compensator as claimed in claim 2, wherein the sliding ram includes a second flow channel portion with an elbow bend of the flow channel, said housing block and said sliding ram being positioned with respect to each other such that, at the operating temperature of product flowing through the fixed installation and the compensator, the sliding ram assumes a position within the sliding seat in which the elbow bend is at least largely congruent with the first flow channel portion in the housing block, and wherein said second flange portion on the sliding ram comprises an outlet flange.

4. A compensator as claimed in claim 1, wherein the sliding ram comprises two ram portions having different diameters, including a first longer ram portion having a smaller diameter and a second shorter ram portion having a larger diameter.

5. A compensator as claimed in claim 4, wherein the housing block encloses a cylindrical sliding seat for the sliding ram and wherein the sliding seat widens into a collar having an internal opening of a size sufficient to accommodate the shorter ram portion.

6. A compensator as claimed in claim 5, wherein, at the operating temperature of the compensator, the shorter ram portion bears against the collar and wherein, at temperatures less than the operating temperature, the sliding ram is displaced in the direction of the second flow channel portion and the shorter ram portion is spaced from the collar.

7. A compensator as claimed in claim 6, wherein the maximum displacement distance of the sliding ram is equal to the diameter of the first flow channel portion, less at least 5 mm.

8. A compensator as claimed in claim 1, further comprising a heater associated with the compensator.

9. A compensator as claimed in claim 8, wherein said heater comprises at least one heating plate on the outside of the compensator.

10. An extrusion installation for polymer articles, comprising a compensator as defined by claim 1 connecting two polymer melt lines running at an angle to each other.

11. An extrusion installation as claimed in claim 10, wherein said angle is a right angle.

12. A method for compensating for axial thermal expansion of product lines in an installation for processing a heated product, comprising the step of connecting a compensator as defined by claim 1 in the flow path between two heated product lines that meet at an angle.

13. A method as claimed in claim 12, wherein said product comprises a heat-plastified polymer.

14. A method as claimed in claim 12, wherein said angle is a right angle.

* * * * *